Figure 6:
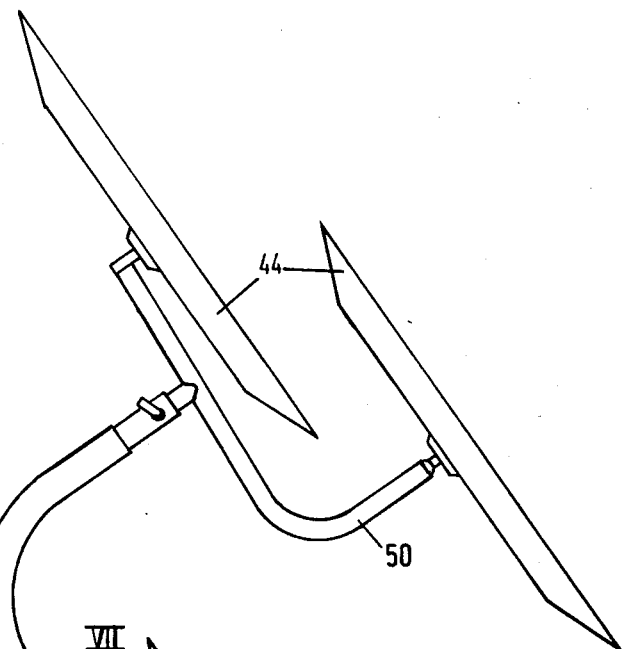

United States Patent [19]
Delgado Delgado

[11] 3,977,166
[45] Aug. 31, 1976

[54] SIDE DELIVERY RAKE

[75] Inventor: Luis Delgado Delgado, Palencia, Spain

[73] Assignee: Vicon Espana S.A., Palencia, Spain

[22] Filed: Feb. 4, 1975

[21] Appl. No.: 547,037

[30] Foreign Application Priority Data
Feb. 8, 1974 Spain ................................ 423,036

[52] U.S. Cl. ................................ 56/366; 56/15.8; 280/462
[51] Int. Cl.² .......................................... A01D 77/00
[58] Field of Search .................. 56/15.5, 15.9, 15.7, 56/15.8, 366, 365, 367, 370, 371, 372, 375, 376, 377; 280/446 R, 447, 456 R, 456 A, 460 R, 460 A, 461 R, 461 A, 462

[56] References Cited
UNITED STATES PATENTS

| 2,896,392 | 7/1959 | van der Lely et al ................. 56/377 |
| 2,928,226 | 3/1960 | van der Lely et al ................. 56/15.5 |
| 2,947,135 | 8/1960 | van der Lely et al ................. 56/377 |

*Primary Examiner*—Russell R. Kinsey
*Attorney, Agent, or Firm*—Snyder, Brown and Ramik

[57] ABSTRACT

A rake comprising a frame, a plurality of rake wheels rotatably journalled by the frame and three members for fastening the frame to the three suspension rods of a tractor is simplified due to the fact that the fastening members are arranged on the three ends of a T-shaped frame tilted over an acute angle.

17 Claims, 11 Drawing Figures

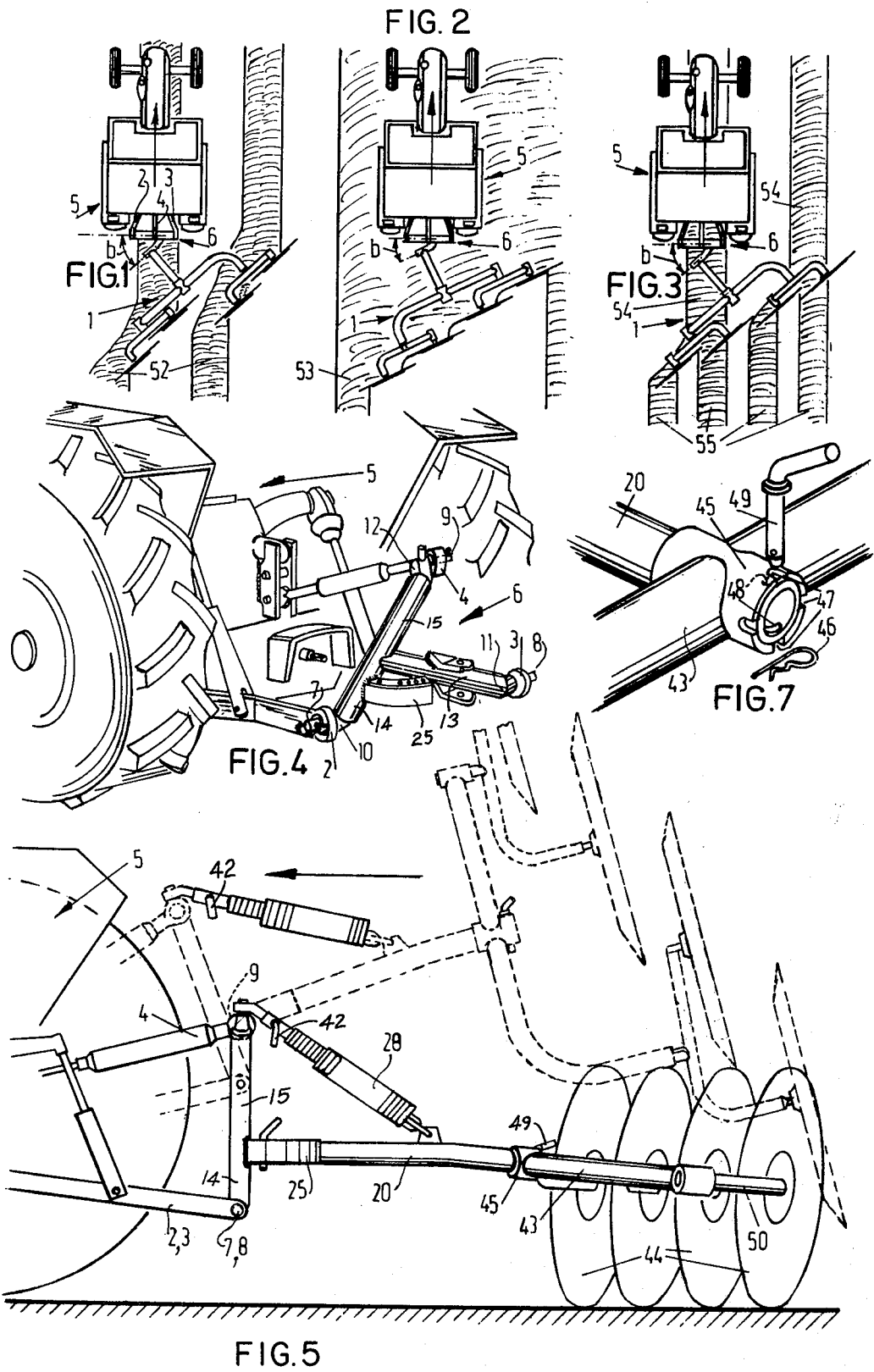

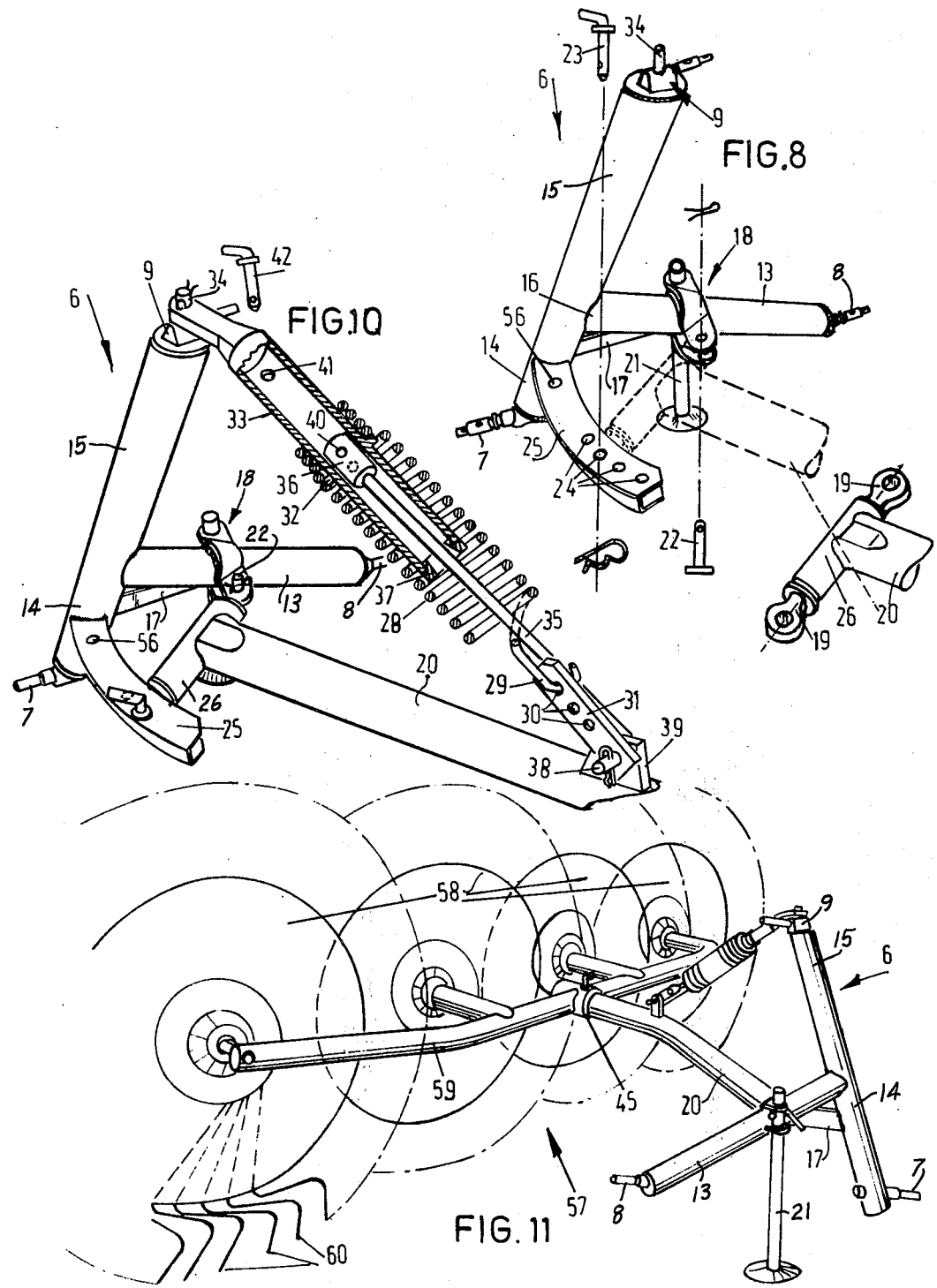

SIDE DELIVERY RAKE

The invention relates to a rake comprising at least a frame, a plurality of rake wheels rotatably journalled by the frame and three members for fastening the frame to the three suspension rods of a tractor.

Such a rake is known.

The invention as for its object to provide a simple rake of the kind set forth.

For this purpose the fastening members are arranged on the three ends of a T-shaped frame tilted over an acute angle. The frame of this rake can be manufactured in a particularly simple manner. It may consist, for example, mainly of two tubular members welded to one another.

In order to stiffen the weld between the tubular members it is preferred to arrange a strut between one tubular member which is the stem and an arm of the other tubular member of the T-shaped frame.

The aforesaid and other features of the invention will be described more fully in the following specification with reference to the drawings.

Figure 9:
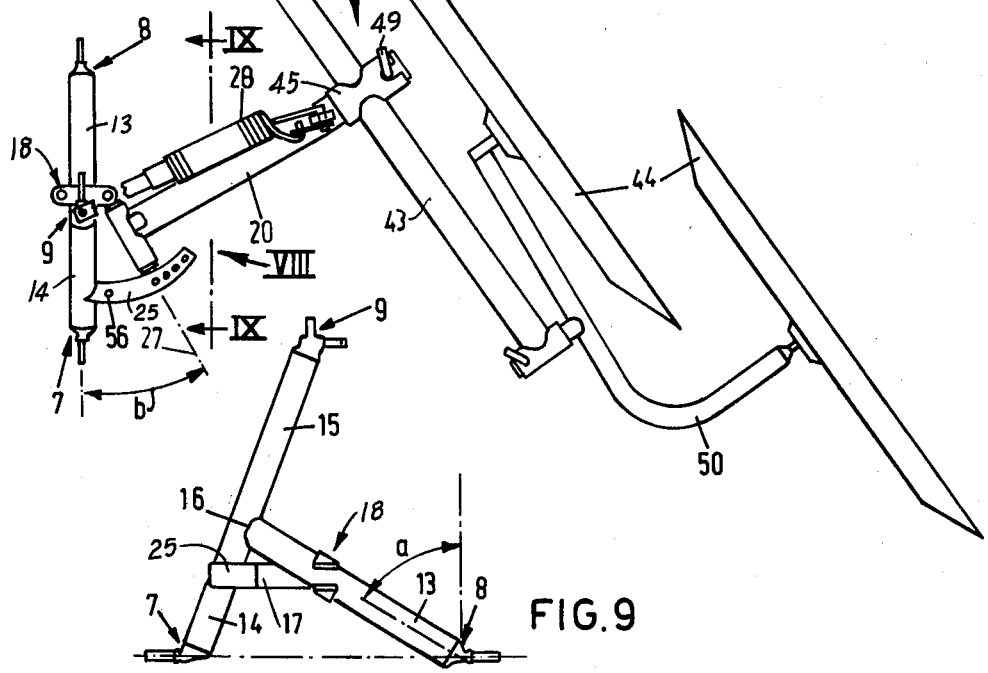

In the drawings:

FIGS. 1, 2 and 3 are each a schematic plan view of a preferred embodiment of a rake in accordance with the invention, towed by a tractor in three different working positions, FIG. 4 is a perspective view of the frame of the rake of FIG. 1 attached to a tractor, FIG. 5 is a side elevation of the rake of FIG. 1, FIG. 6 is an enlarged plan view of the rake of FIG. 1, FIG. 7 is a perspective view of the detail VII of FIG. 6, FIG. 8 is a perspective view of a dismounted detail VIII of FIG. 6, FIG. 9 is an elevation taken in the direction of the arrows IX—IX in FIG. 6, FIG. 10 is an broken away perspective view of the detail VIII of FIG. 6 and FIG. 11 is a perspective view of a further type of a rake embodying the invention held on a ground support.

The rake 1 of FIGS. 1 to 10 is suspended, in operation, to the three suspension bars 2, 3 and 4 of a tractor 5. The ends of the suspension bars 2, 3 and 4 engage three fastening members 7, 8 and 9 welded to the three ends 10, 11 and 12 respectively of a T-shaped frame 6, tilted through an acute angle $a$ (see FIG. 9) of about 60°. The frame 6 is mainly formed by two tubular members welded to one another, one tubular member forming the stem 13 of the T and the other member forming the two arms 14 and 15. In order to reinforce the weld 16 a strut 17 is arranged between the stem 13 and the arm 14. The fastening members 7, 8 and 9 are each formed, for example, by a casting having a horizontal pin on which the end of each tractor suspension bar 2, 3 or 4 is adapted to hinge.

The stem 13 of the T-shaped frame 6 has secured to it a bracket 18, which presents on one side of the stem a connecting point for one end of the arm 19 (see FIG. 8) of a drawbar 20 and on the other side of the stem an ear to which the ground support 21 is attached. The ground support 21 only serves for holding the rake 1 when disengaged from the tractor 5.

The arm 19 is pivotally connected at one end by means of a pin 22 to the bracket 18 and the stem 13 and can be fastened at the other end in an adjustable position to the frame 6 by means of a pin 23, which can be inserted at will into one of the holes 24 of an arcuate part 25 secured, e.g. by welding to the arm 14.

The front end of the drawbar 20 is formed with a horizontal sleeve 26 adapted to pivot about the arm 19. Thus, the drawbar 20 is adapted to pivot about a horizontal axis 27 (FIG. 6) which is at an adjustable acute angle $b$ to the transverse axis defined by the members 7 and 8 6, depending on the position of the arm 19 fixed by the pin 23.

The rear end of the drawbar 20 is suspended from the top end of the frame 6 through a draw spring 28. The spring 28 has a hooked end 29 disposed in one of the holes 30 drilled in a plate 31 pivotally connected to an ear 39 integral with the drawbar 20 and the other end surrounds a shoulder 32 of a cylinder 33, the top closed end of which is pivotable on a pin 34 of the fastening member 9 that extends from the arm 15. In the cylinder 33 a rod 35 having an enlarged end or stop 36 is adapted to slide, said stop 36 co-operating with a restraining rim 37 of the cylinder 33 when the fastening member 9 is pulled upwards and toward the tractor. The rod 35 has its lower hooked end 38 disposed in aligned holes in the ear 39 and the plate 31.

In order to change over the rake 1 to a transport position the fastening member 9 is moved by means of the suspension bar 4 until a hole 40 in the stop 36 registers with a hole 41 in the side wall of the cylinder 33. The drawbar 20 is then rigidly connected with the frame 6 by passing a pin 42 through the holes 40 and 41 (FIG. 10). Then the drawbar 20 can be lifted for road transport (position shown in dotted line in FIG. 5).

A support 43 for four rake wheels 44 is adapted to pivot about the rear end of the drawbar 20 by means of a bearing or bushing 45 having recesses 47 at angular intervals of 90° (FIG. 7), which recesses may be aligned at will to diametrally opposed holes 48 in the rear end of the drawbar 20 in order to fix the support 43 on the drawbar 20 by means of a pin 49 and a clip 46.

The support 43 has two subordinate supports 50 pivoted to the former. In each subordinate support 50 are rotatably journalled two rake wheels 44. In accordance with the position of the subordinate supports 50 relative to the support 43 and in accordance with the pivotal position of the support 43 relative to the drawbar 20 and in accordance with the angle $b$ various treatments can be carried out with the rake according to the invention, i.e. turning as illustrated in FIG. 1, where two swaths 52 are turned, side delively windrowing as illustrated in FIG. 2, the crop being assembled to a swath 53, spreading as illustrated in FIG. 3, two swaths 54 being divided into four swaths 55.

In the transport position the arm 19 is fastened to the frame 6 through a hole 56 (FIG. 8), drilled in the bracket 25 adjacent to arm 14 and the support 43 is turned around the drawbar 20 to its vertical transport position, then being located right behind the tractor 5.

The rake 57 of FIG. 11 has the same frame 6 as the rake 1 of FIGS. 1 to 10. The rake wheels thereof are all rotatably journalled in one and the same support 59, which is adapted to pivot between a working position and a transport position about the rear end 46 of the drawbar 27.

In this embodiment each of said rake wheels comprises a hub 58 and resilient tines 60 secured to said hub.

What I claim is:

1. A rake and attaching assembly therefor, comprising in combination:
an attaching frame adapted to be attached to a three-point tractor hitch, said attaching frame comprising a pair of members rigidly secured together to form a T configuration in which one member forms the stem thereof and the other member forms the arms thereof, first pivot means at the free end of said stem for pivotal attachment to one lower arm of the three-point hitch, second pivot means at the free end of one of said arms for pivotal attachment to the other lower arm of the three-point hitch, and third pivot means at the free end of said other arm for pivotal attachment to the upper member of the three-point hitch whereby said first and second pivot means define a horizontal transverse axis so that said stem inclines upwardly from said first pivot means at an acute angle with respect to the vertical and said other member inclines upwardly from said second pivot means at an acute angle with respect to the vertical;
said rake comprising a supporting frame and a plurality of rake wheels rotatably supported thereon, and a drawbar projecting forwardly from said supporting frame, said drawbar having a horizontal arm extending transversely to the axis of said drawbar; and
attachment means on said stem and said one arm for securing the opposite ends of said horizontal arm to said attaching frame.

2. A rake and attaching assembly as defined in claim 1 wherein said attachment means comprises a bracket fixed to said stem and a trailing bracket fixed to said one arm, said trailing bracket having a series of holes therein and a pin selectively received in said holes for securing one end of said horizontal arm and constraining said axis of the drawbar to be at a selected angle with respect to said horizontal axis defined by said first and second pivot means.

3. A rake and attaching assembly as defined in claim 2 wherein said one arm is pivotally attached to said drawbar, and including spring means suspending said drawbar from said other arm.

4. A rake and attaching assembly as defined in claim 1 wherein said one arm is pivotally attached to said drawbar, and including spring means suspending said drawbar from said other arm.

5. A rake and attaching assembly as defined in claim 1 wherein said supporting frame is pivotally attached to said drawbar for rotation about the axis thereof.

6. A rake and attaching assembly as defined in claim 2 wherein said supporting frame is pivotally attached to said drawbar for rotation about the axis thereof.

7. A rake and attaching assembly as defined in claim 3 wherein said supporting frame is pivotally attached to said drawbar for rotation about the axis thereof.

8. A rake and attaching assembly as defined in claim 4 wherein said supporting frame is pivotally attached to said drawbar for rotation about the axis thereof.

9. A rake and attaching assembly as defined in claim 5 including means for selectively fixing said supporting frame to said drawbar both in a horizontal and a vertical disposition relative thereto.

10. A rake and attaching assembly as defined in claim 6 including means for selectively fixing said supporting frame to said drawbar both in a horizontal and a vertical disposition relative thereto.

11. A rake and attaching assembly as defined in claim 7 including means for selectively fixing said supporting frame to said drawbar both in a horizontal and a vertical disposition relative thereto.

12. A rake and attaching assembly as defined in claim 8 including means for selectively fixing said supporting frame to said drawbar both in a horizontal and a vertical disposition relative thereto.

13. A rake comprising at least a supporting frame and a plurality of rake wheels rotatably carried by said supporting frame, and an attaching frame for connecting said supporting frame to a three-point tractor hitch, said attaching frame comprising a pair of members rigidly secured together to define a T configuration in which one member forms the stem thereof and the other member forms the two arms thereof, first pivot means attached to the free end of said stem for pivotal attachment to one of the lower points of the three-point hitch and comprising a fastening member fixed to said free end of said stem and having a first pin projecting therefrom at an obtuse angle with respect to the axis of said stem, second pivot means attached to the free end of one of said arms for pivotal attachment to the other lower point of the three-point hitch and comprising a fastening member fixed to said free end of said one arm and having a second pin projecting therefrom at an obtuse angle with respect to the axis of said other member, and third pivot means attached to the free end of the other arm for pivotal attachment to the third point of the three-point hitch and having a third pin projecting therefrom at an obtuse angle with respect to the axis of said other member, said first and second pins projecting in opposite directions and being coaxial whereas said third pin projects in the same direction as said first pin in parallel relation thereto whereby said stem inclines upwardly from said first pivot means at an acute angle with the vertical to intersect said other member whereas said other member inclines upwardly from said second pivot means at an acute angle with the vertical.

14. A rake as defined in claim 13 including a first attaching bracket fixed to said stem between the ends thereof and a second attaching bracket attached to said one arm between the ends thereof, said first and second brackets being spaced apart but aligned with respect to each other in a plane parallel to said first and second pins.

15. A rake as defined in claim 14 wherein said first attaching bracket is provided with a vertical pin-receiving opening and said second attaching bracket is provided with a series of vertical pin-receiving openings disposed along an arc centered on the opening in said first attaching bracket.

16. A rake comprising at least a supporting frame and a plurality of rake wheels rotatably carried by said supporting frame and an attaching frame for connecting said supporting frame to a three-point tractor hitch, said attaching frame comprising a pair of members rigidly secured together to define a T-configuration in which one member forms the stem thereof and the other member forms the two arms thereof, first, second and third pins attached to the free ends respectively of said stem and said two arms, said first and second pins projecting angularly with respect to said stem and one of said two arms respectively to define a common axis whereby said first pin may be attached to one lower point of said three-point tractor hitch and said second pin may be attached to the other lower point of said three-point tractor hitch with said stem and said one arm inclined upwardly and inwardly from their respective lower points to dispose said third pin in an elevated position, said third pin projecting angularly with respect to the other of said two arms to define an axis parallel to said common axis whereby said third pin may be attached to the upper point of said three-point tractor hitch, and drawbar means pivotally connected between said stem and said one arm and connected to said supporting frame for trailing said supporting frame behind said attaching frame.

17. A rake and attaching assembly therefor, comprising in combination:

an attaching frame adapted to be attached to a three-point tractor hitch, said attaching frame comprising a pair of members rigidly secured together to form a T configuration in which one member forms the stem thereof and the other member forms the arms thereof, first pivot means at the free end of said stem for pivotal attachment to one lower arm on the three-point hitch, second pivot means at the free end of one of said arms for pivotal attachment to the other lower arm of the three-point hitch, and third pivot means at the free end of said other arm for pivotal attachment to the upper member of the three-point hitch whereby said first and second pivot means define a horizontal transverse axis so that said stem inclines upwardly from said first pivot means at an acute angle with respect to the vertical and said other member inclines upwardly from said second pivot means at an acute angle with respect to the vertical;

said rake comprising a supporting frame and a plurality of rake wheels rotatably supported thereon, and a drawbar projecting forwardly from said supporting frame; and attachment means on said stem and said one arm for pivotally attaching the forward end of said drawbar thereto.

* * * * *